Figure 4:
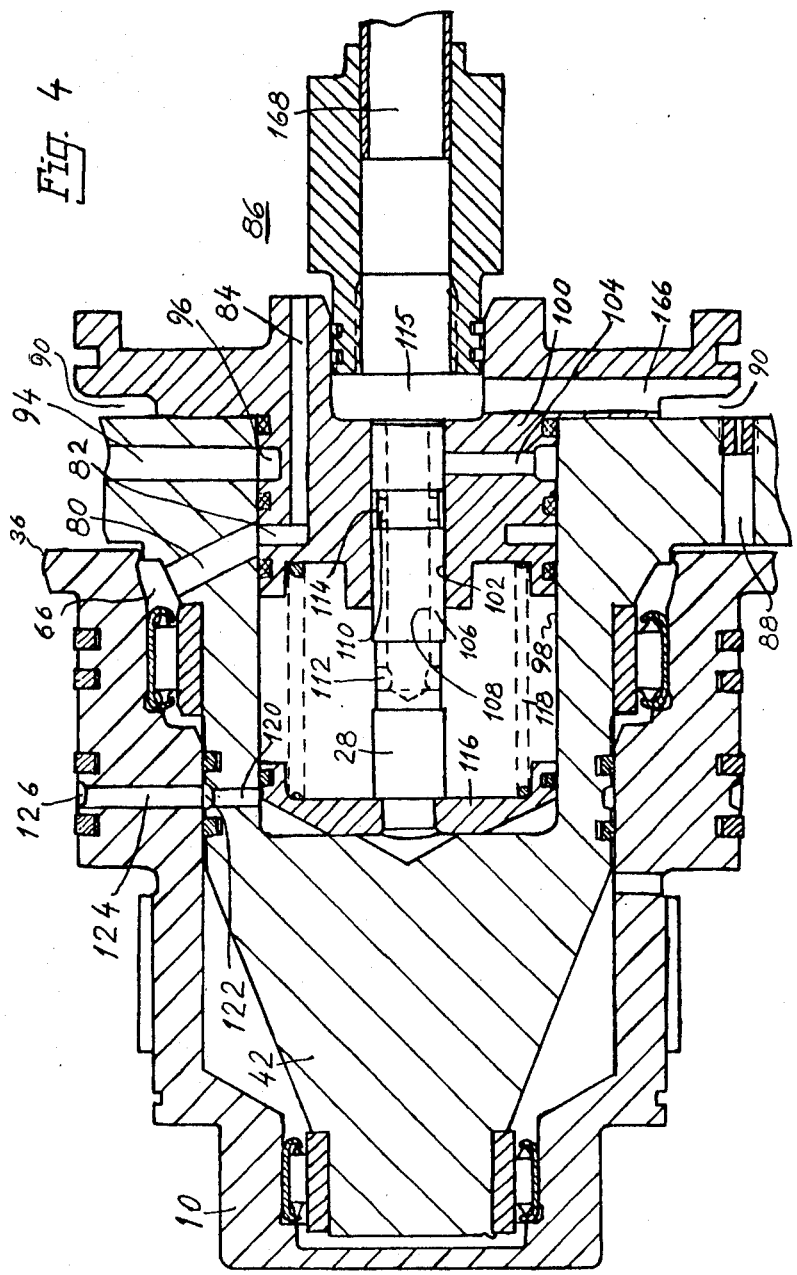

Oct. 26, 1965     K. G. ÅHLÉN     3,213,982
TRANSMISSION COMPRISING A HYDROSTATIC COUPLING
AND A HYDRODYNAMIC TORQUE CONVERTER IN SERIES
Filed Dec. 13, 1960     3 Sheets-Sheet 1
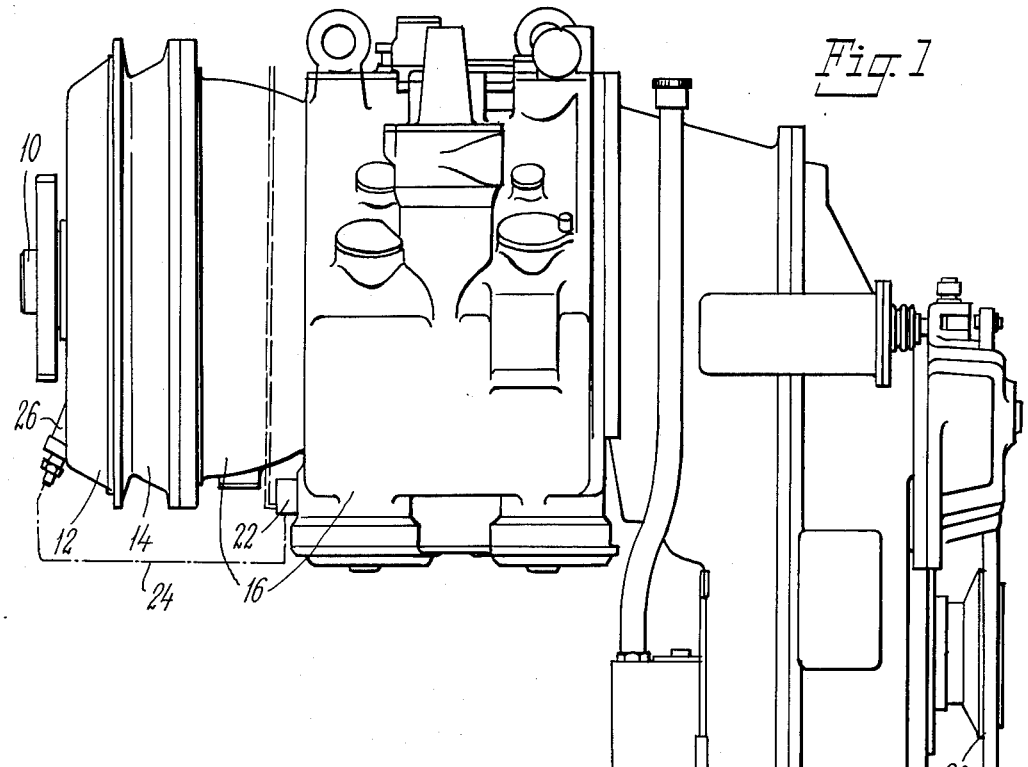
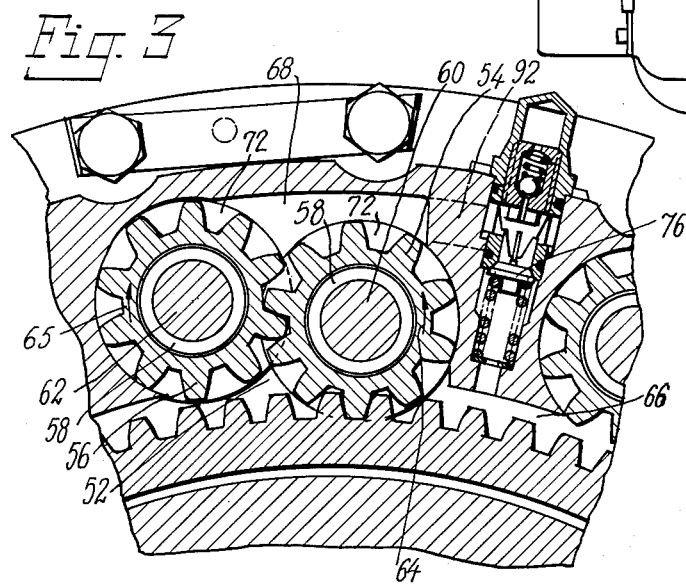
INVENTOR.
BY

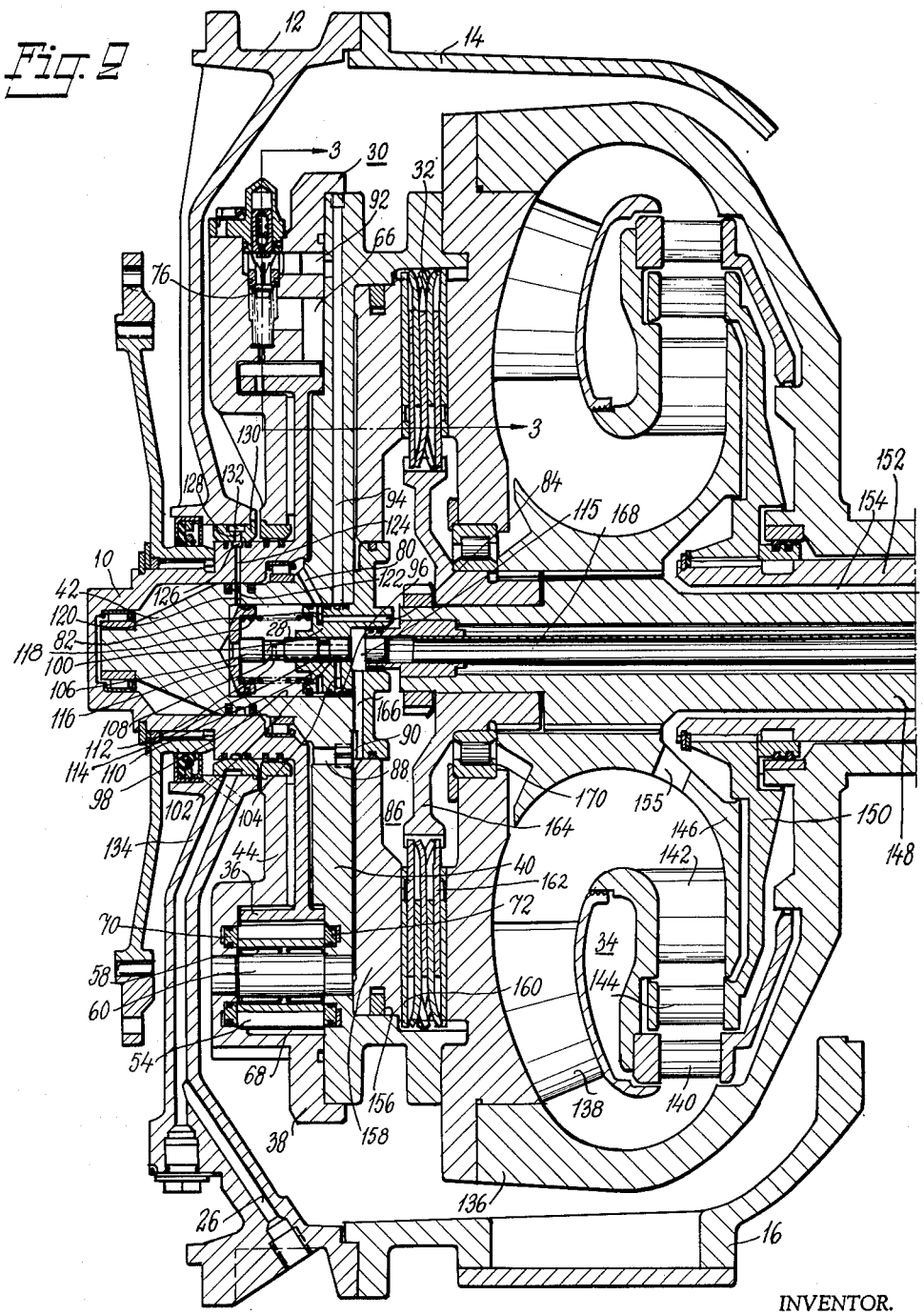

United States Patent Office 3,213,982
Patented Oct. 26, 1965

3,213,982
TRANSMISSION COMPRISING A HYDROSTATIC COUPLING AND A HYDRODYNAMIC TORQUE CONVERTER IN SERIES
Karl Gustav Åhlén, Stockholm, Sweden, assignor to Svenska Rotor Maskiner Aktiebolag, Stockholm, Sweden, a company
Filed Dec. 13, 1960, Ser. No. 75,634
Claims priority, application Sweden, Dec. 19, 1959, 11,979/59
5 Claims. (Cl. 192—3.2)

In transmissions including a hydrodynamic torque converter problems arise in preventing the transmission of power through the transmission at idling speeds. Said transmission of power particularly in a vehicle drive results in a tendency of the vehicle to move and furthermore problems arise in changing from forward drive to reverse drive and vice versa. Up to now in order to solve these problems a mechanical friction clutch has been provided in series with the transmission.

Lately, however, particularly for railway service hydrostatic couplings have been provided in series with such transmissions to take up vibrations, to prevent unequal distribution of the load among the engines in multi engine drives and to provide a synchronization device for a mechanical direct clutch overbridging the hydrodynamic torque converter.

With such hydrostatic couplings, attempts have been made to use the couplings as release clutches by opening of the maximum pressure valves of the coupling, the thought being that the liquid in the coupling would circulate freely and thus transmit no torque. However, it is impossible to obtain a solution in this way since the friction between the rotating driving member and the liquid results in rapid rotation of the liquid with the result that friction between driven member and the liquid causes rotation of the driven member.

The present invention, however, serves to solve the problems mentioned above.

In hydrostatic couplings of the present type some heat develops as a result of the power losses. For this reason the liquid is circulated through a cooler located outside the coupling. When the coupling is combined in a transmission with a hydrodynamic torque converter, it is advantageous to have both the coupling and the converter use the same circulating fluid. In this arrangement the cooled liquid is supplied to the transmission at a relatively high pressure and is carried away at a much lower pressure. Owing to the fact that the quantities of heat which need to be dissipated from the hydrostatic coupling are relatively small the inlet and the outlet openings of the coupling for the working liquid must be made with very restricted areas.

The invention is based on this fact and is characterized by a selectively adjustable valve for connection of the high pressure chambers of the pumps which are parts of the hydrostatic coupling with the outlet conduit. In this way the quantity of liquid flowing through the pumps is conveyed through the selectively adjustable valve to the cooler instead of to the low pressure chamber of the coupling. The supply of liquid to the low pressure chamber is thus restricted to the quantity of liquid supplied through the inlet openings mentioned above. As these openings have very restricted areas the low pressure chamber of the coupling will be partially emptied so that the power transmitted from one member of the coupling to the other by friction through the liquid is reduced appreciably. By a suitable dimensioning of the selectively adjustable valve in relation to the inlet openings for the liquid the quantity of liquid passing through the coupling can be chosen so that it is enough to lubricate and to cool the coupling but permits a considerable degree of slip between the primary and secondary members of the coupling.

A hydrodynamic torque converter, as is well known, has the characteristic that its torque absorbtion is approximately proportional to the square of the speed of the pump member. As a result of the slip in the hydrostatic coupling the speed of the pump member of the converter and thus the torque absorbtion capacity is reduced. If the speed of the output shaft of the coupling, i.e., the pump member shaft of the converter, is 50% of the speed of the input shaft of the coupling the torque absorbtion capacity of the converter is reduced to 25% and with a pump member shaft speed which is 33% of the speed of the input shaft the torque absorbtion capacity is reduced to 11% of the torque absorbtion capacity when the coupling is operating with no slip at all. The decrease of the torque absorbtion that can be obtained in this way is sufficient to prevent creeping at idling speed and to make a change over operation between forward drive and reverse drive possible.

In a preferred embodiment the selectively adjustable valve is located in the center of the coupling and is slidable in an axial direction.

Furthermore it is desirable that the selectively adjustable valve be operated hydraulically. If a hydrostatic coupling is located in series with a hydrodynamic torque converter as well as with a mechanical direct clutch hydraulically operated and overbridging the converter it is desirable that the inlet opening for the liquid communicates with the working chamber of the torque converter and that the selectively adjustable valve communicates with the pressure actuating chamber or cylinder of the direct clutch. In such a transmission the change between torque converter and direct clutch may be controlled by a common valve and in some systems it is possible to also operate the selectively adjustable valve by that common valve.

In other arrangements it is possible to operate the selectively adjustable valve by pressure fluid from a separate pump.

A preferred embodiment of the invention will be described in detail with reference to the drawings in which FIG. 1 is a longitudinal elevational view of a transmission according to the invention, FIG. 2 is a longitudinal section through a part of the transmission shown in FIG. 1, FIG. 3 is a transverse section along the line 3—3 in FIG. 2, and FIG. 4 is an enlarged sectional view of a portion of FIG. 2.

In FIG. 1, 10 indicates the input shaft, 12 indicates the casing of a hydrostatic coupling, 14 indicates the casing of a direct clutch 16, indicates the casing of a hydrodynamic torque converter, 18 indicates the casing of a reverse gear, and 20 indicates the output shaft. An electric pump 22 is fixed to the casing 16 and is adapted to feed pressure fluid through a conduit 24 to a channel 26 in the casing 12 and through said channel to a valve 28 (FIG. 2).

FIG. 2 shows a longitudinal section through a hydrostatic coupling 30, through a direct clutch 32 and also through a part of a hydrodynamic torque converter 34. A central gear 36 providing a driving member is fixed to the input shaft 10. Said gear is located inside a casing 38 filled with liquid and providing a driven member. One end wall 40 of the casing 38 is provided with a stub shaft 42 on which the shaft 10 is journalled and the other end wall 44 of the casing 38 is in sealing engagement with the shaft 10.

Several recesses 52 are provided in the casing 38 radially outside the gear 36. In each of said recesses, as shown in FIG. 3, two intermeshing toothed gears 54, 56 are rotatably journalled on needle bearings 58 mounted on shafts 60, 62 which are fixed in the casing 38. One gear 54 of each pair of gears is in mesh with the gear 36 so that this gear 36 acts as a sun gear, the other gears 54 act as planets, and the casing 38 acts as a planet carrier.

The two gears 54, 56 rotate in the directions of the arrows 64 and 65, respectively (FIG. 3) and act as a gear pump having a suction side feeding fluid from the central chamber 66 of the casing 38 which communicates with the recesses 52 to a pressure chamber 68 located radially outside the gears 54 and 56. On opposite ends of the gears 54 and 56 sealing plates 70, 72 are provided which are forced axially against the opposite ends of gears 54 and 56 by pressure fluid supplied from the pump to the outer sides of the plates 70 and 72.

Between each pressure chamber 68 and the central chamber 66 a circulation duct with a maximum pressure valve 76 is provided.

The several recesses 52, each containing a separate gear pump provided by gears 54, 56, arranged around the preiphery of the central supply chamber and with the pressure chamber 38 of each pump connected to the supply chamber by a circulation duct controlled by a maximum pressure valve, is conventional construction for hydraulic couplings of this character, as exemplified by my prior Patent Number 2,931,472 dated April 5, 1960 (see particularly FIG. 3 thereof).

The central chamber 66 communicates through the channels 80, 82, 84 with a chamber 86 outside the hydrostatic coupling as shown in FIGS. 2 and 4. The central chamber 66 also communicates through the channel 88 with a second chamber 90 outside the hydrostatic coupling as shown in FIGS. 2 and 4. The following details are shown in FIG. 2 and a portion thereof to an enlarged scale in FIG. 4.

Each pressure chamber 68 communicates through channels 92, 94 with an annular groove 96 in a bushing 100 axially fixed in a bore 98 of the stub shaft 42. This bushing is provided with an axial central bore 102 passing through the bushing which bore 102 at least one radial bore 104 communicates with the annular groove 96. The valve 28 is axially slidable in the bore 102.

The valve 28, as shown in FIG. 4, comprises a spindle 106 closely sealing against the bore 102. This spindle is provided with a central bore 108 open to one end of the spindle. Furthermore the spindle 106 is provided with two axially spaced transverse bores 110 and 112, respectively. An anular groove 114 is provided in the outer surface of the spindle and this groove communicates with the bore 100. At one axial position of the valve 28 the bore 104 communicates with the groove 114 and thus through the bores 110 and 108 with the chamber 115. The valve spindle 106 is provided with a disc-like piston 116 located at the opposite end of the spindle from the chamber 115 which piston is in sealing slidable contact with the wall of the bore 98. The piston 116 is urged by a spring 118 in a direction away from the chamber 115. The part of the bore 98 located on the opposite side of the piston 116 from the chamber 115 communicates through at least one radial bore 120 with an annular groove 122 in the outer surface of the stub shaft 42. This groove 122 communicates through at least one radial bore 124 in the shaft 10 with an annular groove 126 in the outer surface of the shaft 10. This groove 126 communicates through at least one radial bore 128 in a bushing 130 with an annular groove 132 in the outer surface of the bushing 130. The groove 132 communicates with the channel 26 of the end wall 134 of the casing 12.

The torque converter 34 is of a type known per se. A rotating casing 136 of the converter is fixed to the casing 38 of the coupling and provides a working chamber. A pump blade ring 138 providing an impeller is fixed in the casing 136. Two rings of turbine blades 140, 142 are provided in the torque converter and a ring of reaction blades 144 is provided between the rings of turbine blades. The rings of turbine blade 140, 142 are fixed to a turbine disc 146 which is fixed to a turbine shaft 148. The ring of reaction blades 144 is fixed to a reaction disc 150 which in turn is fixed to a reaction shaft 152 concentric with the turbine shaft, 148. An annular channel 154 for supplying liquid to the converter 34 through the opening 155 of the turbine disc 146 is provided between the two shafts 148 and 152

The direct clutch 32 includes a cup-shaped recess 156 in the casing 38 in which recess a piston 158 is axially slidable against a set of clutch discs comprising a number of discs 160 non-rotatably fixed to the casing 38 and a number of discs 162 non-rotatably fixed to a hub 164 non-rotatably fixed to the turbine shaft 148. The chamber 90 providing between the casing 38 and the piston 158 communicates through channels 166 in the bushing 100 with the chamber 115 which in turn communicates through a channel 168 in the turbine shaft 148 with an outlet during torque converter drive and with a high pressure liquid source during direct drive.

The device for restriction of the torque through the hydrostatic coupling operates in the following way. During hydraulic drive the working liquid circulates from a pressure liquid source through the channel 154, the opening 155, the bearing 170, the disc set 160, 162, the chamber 86 and the channels 84, 82, 80 to the central chamber 66 of the hydrostatic coupling and from there through the channel 88, the chamber 90, the channels 166, the chamber 115 and the channel 168 to an outlet. At idling speed of the motor the hydrostatic coupling acts practically without any slip, i.e., without any passage of liquid through the gear pumps. For this reason the casing 38 rotates at substantially the same speed as that of the central gear 36.

With a halting vehicle, in which the power transmission of this invention is installed, at rest a certain portion of the power is transmited to the driving wheels whereby the vehicle tends to move. Furthermore there may be difficulties in shifting between forward and reverse drive.

By supplying pressure liquid from the pump 22 through the conduit 24 and the channels 26, 132, 128, 126, 124, 122 and 120 to the bore 98 the piston 116 and thus the valve 28 is moved (to the right from the position shown in FIGS. 2 and 4) to a position where the groove 114 communicates with the bore 104. As a result the liquid in the pressure chambers 68 of the pumps of the hydrostatic coupling flows then through the channels 92, 94, 96, 104, 114, 110, 108 and into the chamber 115 and from there through the channel 168 to an outlet. The gears 54, 56 constantly begin to rotate and to pump liquid from the low pressure chamber 66 to the high pressure chambers 68 from which chambers as described above the liquid flows to the outlet. As a result of the restricted area of the opening 84 the same volume of liquid can not flow into the low pressure chamber 66 as the volume simultaneously carried off through the pumps provided by gears 54, 56. In this way the volume of the liquid in the low pressure chamber is decreased until a state of balance between the liquid supplied to the chamber 66 and the liquid carried off therefrom arises due to the centrifugal forces and the dimensions of the outlet channels. The removal of liquid from the coupling does not, however, continue sufficiently to exhaust the liquid in the coupling to an extent which will destroy necessary lubrication and cooling.

When the gears 54, 56 begin to rotate there results a corresponding difference in speed between the central gear 36 and the casing 38, i.e., the coupling is slipping. When the coupling slips the speed of the casing 136 and pump blade means 138 of the hydrodynamic torque converter decreases to that the torque absorption capacity of the torque converter decreases as this capacity is about proportional to the square of the speed of the pump blade ring 138. A slip of the coupling which decreases the speed 50% thus causes a decrease in the torque transmitted of 75% and a slip which decreases the speed with 67% causes a decrease in the torque transmitted of 89% In this way a reduction of the torque transmitted is obtained that in the practice is substantially equivalent to providing a complete interruption of the drive.

Before starting the vehicle the pump 22 is again stopped so that the valve 28 operated by the spring 118 once more breaks the communication between the high pressure chambers 68 and the outlet duct 168. The low pressure chamber 66 of the coupling is again filled with liquid and the transmission is in a condition to transmit the normal torque.

I claim:

1. A hydraulic transmission comprising a hydrodynamic torque converter having a working chamber and an impeller for circulating working liquid therein, a hydrostatic coupling for transmitting power to said impeller, said coupling providing a supply chamber for working liquid and comprising a driving member, a driven member relatively rotatable with respect to said driving member and connected to drive said impeller, and positive displacement pump means actuated by relative rotation between said driving and said driven members, the suction side of said pump means being in free communication with said supply chamber and the discharge side of said pump means being connected for return flow of liquid pumped thereby to said supply chamber to provide circulation of working fluid between said supply chamber and said pump means in a closed circulation system during normal operation of the coupling, first conduit means for supplying working liquid to said supply chamber only at a rate restricted to less than that at which said pump means is capable of withdrawing liquid from said chamber, second conduit means for discharging working liquid from said system from the pressure side of said pump means, whereby to enable said pump means to substantially evacuate said supply chamber when said second conduit means is open due to the restricted rate of flow of liquid to said chamber through said first conduit means, and valve means for selectively controlling the discharge of working liquid through said second conduit means.

2. A transmission as defined in claim 1 wherein said valve means is fluid pressure actuated and controls said second conduit means.

3. A transmission as defined in claim 2 wherein the fluid pressure for actuating said valve means is supplied independently of the supply of said working liquid to said coupling.

4. A transmission as defined in claim 1 in which working liquid is supplied to said converter and said second conduit means comprises a connection between said converter and said supply chamber of said coupling.

5. A transmission as defined in claim 4 in which said converter includes an outlet connection for withdrawing liquid from the converter and in which said second conduit means includes said outlet connection, whereby working liquid discharged from the coupling is discharged together with liquid withdrawn from the converter.

References Cited by the Examiner

UNITED STATES PATENTS

| | | | |
|---|---|---|---|
| 1,771,809 | 7/30 | Morgan | 192—58 |
| 1,829,554 | 10/31 | Baher | 192—61 |
| 1,912,323 | 5/33 | Taylor | 192—58 |
| 1,935,400 | 11/33 | Junkers | 192—61 |
| 2,371,227 | 3/45 | Dodge | 192—61 |
| 2,372,326 | 3/45 | Hewitt | 60—54 X |
| 2,540,659 | 2/51 | Del Mar | 192—61 |
| 2,562,464 | 7/51 | Jandasek | 60—54 X |
| 2,613,549 | 10/52 | Thurber | 192—61 X |
| 2,613,772 | 10/52 | Thurber | 192—83 |
| 2,629,266 | 2/53 | Thurber | 192—3.2 |
| 2,644,561 | 7/53 | Dikeman | 192—61 |
| 2,771,972 | 11/56 | Thurber | 60—54 X |
| 2,931,472 | 4/60 | Ahlen | 192—3.2 |

DAVID J. WILLIAMOWSKY, *Primary Examiner.*

THOMAS J. HICKEY, JULIUS E. WEST, *Examiners.*